UNITED STATES PATENT OFFICE.

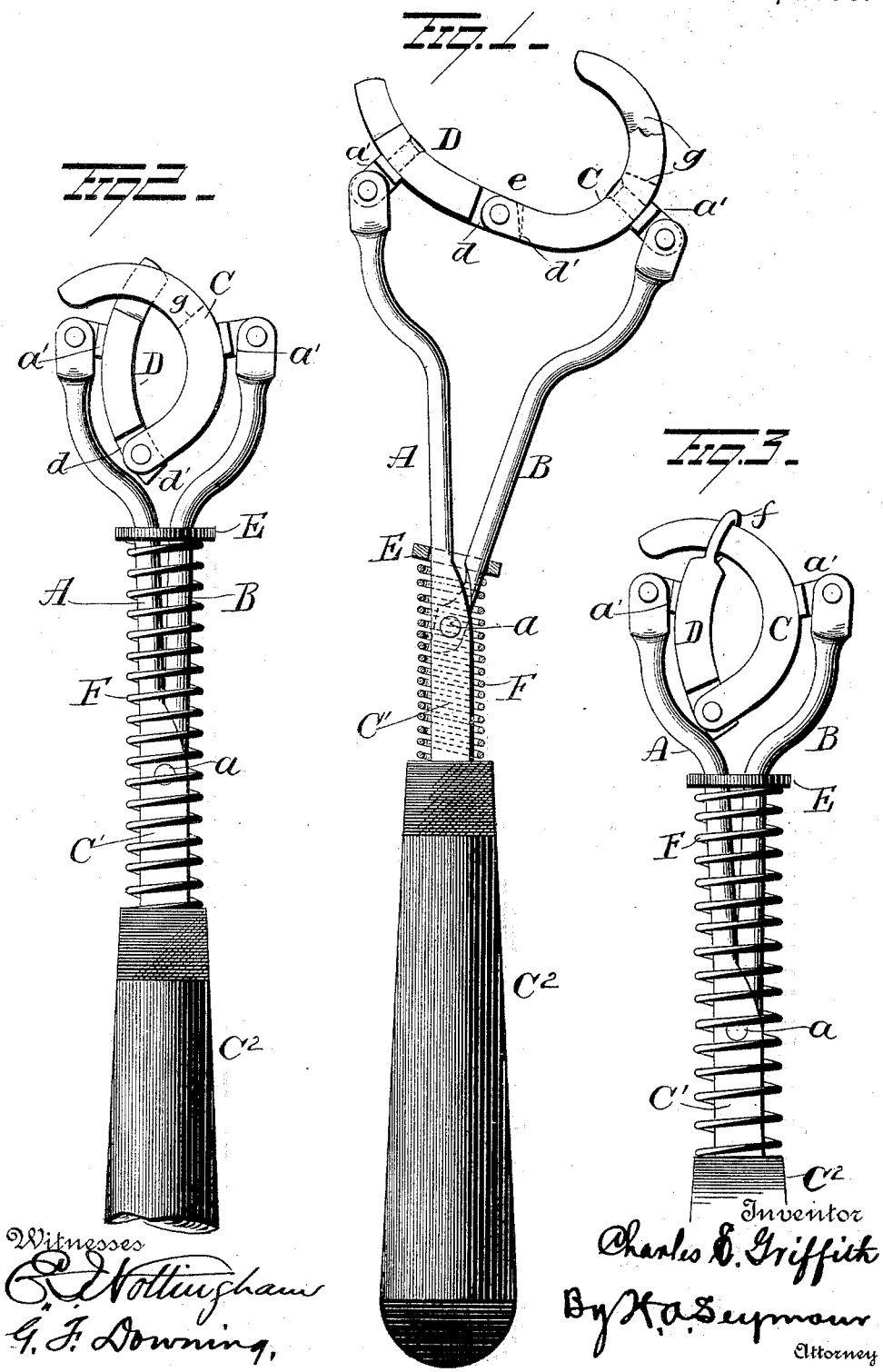

CHARLES E. GRIFFITH, OF STORM LAKE, IOWA.

CATCHING AND HOLDING TOOL.

SPECIFICATION forming part of Letters Patent No. 491,642, dated February 14, 1893.

Application filed August 8, 1892. Serial No. 442,497. (No model.)

*To all whom it may concern:*

Be it known that I, CHARLES E. GRIFFITH, of Storm Lake, in the county of Buena Vista and State of Iowa, have invented certain new and useful Improvements in Catching-Tools; and I do hereby declare the following to be a full, clear, and exact description of the invention, such as will enable others skilled in the art to which it appertains to make and use the same.

My invention relates to an improvement in tools or implements for catching and holding animals,—the object of the invention being to produce a simple and efficient tool or implement for catching animals or fowls without injury thereto.

A further object is to produce an implement for catching animals or fowls which shall be cheap to manufacture, automatic in operation and effectual in the performance of its functions.

With these objects in view the invention consists in certain novel features of construction and combinations and arrangements of parts as hereinafter set forth and pointed out in the claims.

In the accompanying drawings: Figure 1 is an elevation illustrating my improvements, showing the parts in position for use. Fig. 2 is a similar view showing the implement closed. Fig. 3 is a view of a modification.

A, B, represent two arms, hinged together at $a$ and at their upper or outer ends are spread or bent apart and bifurcated.

The arm A is extended inwardly from its pivotal connection with the arm B to produce a shank C', on which a handle C² is placed. Pivotally connected in the bifurcated outer ends of the arms A, B, are lugs or small brackets $a'$, to which jaws C, D, are pivotally connected. The jaw C is substantially semicircular in shape and its inner end is bifurcated for the reception of the shank $d$ of the jaw D, said jaws being pivotally connected together by means of a pin $e$, in such manner that the end of the shank $d$ of the jaw D forms a stop $d'$ which will engage the shoulder at the inner end of the bifurcated portion of the jaw C and prevent the pivotal point of the jaws rising too far, but permitting said pivotal connection to move far enough to carry the inner ends of the jaws out of alignment with each other, so that when the jaws are in their open position as shown in Fig. 1, they will remain so until they are at the point where they are pivoted together. The jaw C is made with an elongated curved slot $g$ for the reception of the jaw D, so that said jaws may close up snugly on the leg of the animal or fowl upon which it is desired to operate the implement. A ring or washer E encircles the arms A, B, and interposed between said ring or washer and the handle C² and encircling the arms A, B, is a spring F, which tends to normally force the ring or washer toward the free ends of the arms to close the same.

In order to set the implement for use, the spring and ring will be pressed back past the pivotal connection of the arms A, B, and said arms separated, and the jaws C, D, opened until their pivotal connection has moved sufficiently far to throw said jaws out of alignment with each other. The implement is now ready for use. When the leg of the fowl or animal to be caught is struck by the jaws C, D, at their pivotal point, said jaws will be released, and the spring forcing the ring E outwardly on the arms A, B, said jaws will be made to quickly close on the leg of the fowl or animal and retained locked by the ring E. By providing a pivotal connection between the jaws and the arms which carry them, said arms may be turned at an angle to the jaws after the latter has grasped the leg of the animal or fowl, and thus injury to the latter will be prevented, by relieving the grasp of the tool on the leg of the animal or fowl.

The implement is adapted to close up so as to leave a small opening when the device is used to catch small animals, or the same implement may be used for larger animals and not close quite so tightly.

Instead of providing the jaw C with a slot to receive the jaw D, the jaw D may be provided with a ring $f$ and the jaw C adapted to pass through said ring $f$, as shown in Fig. 3.

The implement is very simple in construction, cheap to manufacture and effectual in the performance of its functions.

Having fully described my invention what I claim as new and desire to secure by Letters Patent is:

1. In a catching tool, the combination with a pair of arms connected together at one point, and a spring adapted to normally force these arms together or toward each other, of a jaw hinged at a point between its ends to the free end of each arm, said jaws hinged together at their inner ends at which point they are adapted to be struck when open in order to close them, substantially as set forth.

2. In a catching tool, the combination with a pair of arms hinged together, and a spring adapted to throw said arms together, of curved jaws hinged or pivoted to the free ends of the arms, said arms hinged or pivoted together at one end in such manner that they lock the arms apart when opened, the connected ends of the jaws located opposite the opening formed by the open jaws and adapted to be struck to force the arms together, substantially as set forth.

3. In a catching tool, the combination with two arms hinged or pivotally connected together, of two jaws pivotally connected to said arms and pivotally connected together in such manner that when the jaws are open they will be out of alignment with each other, a stop on one of said jaws to prevent said jaws from moving too far when they are opened, and means for automatically closing and locking said jaws, substantially as set forth.

4. In a catching tool, the combination with two arms hinged or pivotally connected together, of a lug or bracket pivotally connected to each arm, a jaw pivotally connected to each lug or bracket, said jaws being pivotally connected together, in such manner that they will maintain themselves open, and means for automatically closing and locking said jaws, substantially as set forth.

5. In a catching tool, the combination with two arms hinged or pivotally connected together, of jaws pivotally connected with said arms and pivotally connected together, one of said jaws being provided with an elongated slot for the reception of the other jaw, and means for automatically closing said jaws, substantially as set forth.

6. In a catching tool the combination with two arms hinged or pivotally connected together, of jaws pivotally connected with said arms and pivotally connected together in such manner that they will maintain themselves open, a spring encircling said arms, and a ring also encircling the arms and in position to be forced toward the extremities of the arms when released, to close and lock the jaws, substantially as set forth.

7. In a catching tool, the combination with two arms hinged or pivotally connected together, of blocks pivotally connected to said arms and jaws pivotally connected to said blocks and pivotally connected together, substantially as set forth.

In testimony whereof I have signed this specification in the presence of two subscribing witnesses.

CHARLES E. GRIFFITH.

Witnesses:
WM. HENRY HANKS,
A. H. WAITT.